(12) United States Patent
Ueno et al.

(10) Patent No.: US 7,859,483 B2
(45) Date of Patent: Dec. 28, 2010

(54) ELECTRONIC CONFERENCE CONTROL DEVICE, ELECTRONIC CONFERENCE ASSISTANCE METHOD, STORAGE MEDIUM, AND COMPUTER DATA SIGNAL

(75) Inventors: Yuichi Ueno, Kanagawa (JP); Motoyuki Takaai, Kanagawa (JP); Eriko Tamaru, Yokohama (JP); Hitoshi Abe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 624 days.

(21) Appl. No.: 11/540,060

(22) Filed: Sep. 29, 2006

(65) Prior Publication Data

US 2007/0195008 A1    Aug. 23, 2007

(30) Foreign Application Priority Data

Feb. 21, 2006    (JP) .............................. 2006-044438

(51) Int. Cl.
   *G09G 5/00*    (2006.01)
(52) U.S. Cl. .......................... 345/1.1; 715/753; 709/204
(58) Field of Classification Search ................. 709/204, 709/208, 200, 205, 248; 345/1.1, 2; 715/753
   See application file for complete search history.

(56) References Cited

U.S. PATENT DOCUMENTS

| | | | |
|---|---|---|---|
| 5,432,525 A * | 7/1995 | Maruo et al. .................. | 345/2.2 |
| 5,617,539 A * | 4/1997 | Ludwig et al. ............... | 709/205 |
| 5,694,544 A | 12/1997 | Tanigawa et al. | |
| 6,195,684 B1 | 2/2001 | Watanabe et al. | |
| 6,411,988 B1 * | 6/2002 | Tafoya et al. ................ | 709/204 |
| 7,016,935 B2 * | 3/2006 | Lee et al. ..................... | 709/204 |

FOREIGN PATENT DOCUMENTS

| | | |
|---|---|---|
| EP | 0497022 | 7/1999 |
| JP | 10322331 | 12/1998 |
| JP | 2003111042 | 4/2003 |

(Continued)

OTHER PUBLICATIONS

Office Action issued Mar. 19, 2008 from the Australian Patent Office for corresponding Australian Patent Application No. 2006225193.

(Continued)

*Primary Examiner*—Stephen G Sherman
(74) *Attorney, Agent, or Firm*—Gauthier & Connors LLP

(57) ABSTRACT

An electronic conference control device has a display controller that controls display of common screen images commonly displayed on display devices, local screen images displayed only on a connected one of the display devices, cut screen images generated by extracting a screen image portion contained in a closed space having a region designated by a user on a screen image displayed on the connected one of the display devices, and common cut screen images commonly displayed on the display devices on the connected one of the display devices, and a screen-dividing processor that, upon selection of one or multiple common cut screen images from among common cut screen images contained in a common screen image displayed on the screen and input of an instruction to start a local discussion at the site, to thereby manage the selected common cut screen image also as a local cut screen image.

10 Claims, 12 Drawing Sheets

FOREIGN PATENT DOCUMENTS

| | | |
|---|---|---|
| JP | 2004094833 | 3/2004 |
| JP | 2004094834 | 3/2004 |
| JP | 2004272473 | 9/2004 |
| WO | 2005029739 | 3/2005 |

OTHER PUBLICATIONS

Office Action issued on Apr. 9, 2008 for corresponding Australian Patent Application No. 2006233231 from the Australian Patent Office.

* cited by examiner

COMMON CUT SCREEN MANAGEMENT TABLE

| CONFER-ENCE ID | ASSIGN-MENT ID | CUT SCREEN ID | COORDINATES OF UPPER LEFT CORNER OF CUT SCREEN (x1,y1) | COORDINATES OF LOWER RIGHT CORNER OF CUT SCREEN (x2,y2) | CUT SCREEN BITMAP DATA |
|---|---|---|---|---|---|
| 41 | null | 502 | (0.14, 0.20) | (0.54, 0.35) | ... |
| 41 | null | 503 | (0.16, 0.45) | (0.56, 0.55) | ... |
| 41 | null | 504 | (0.11, 0.58) | (0.44, 0.78) | ... |
| 42 | null | 591 | (0.56, 0.10) | (0.97, 0.19) | ... |
| ... | ... | ... | ... | ... | ... |

SELECTED STATE
MANAGEMENT TABLE

| SELECTION ID | CUT SCREEN ID |
|---|---|
| 1014 | 502 |
| 1014 | 503 |
| 1015 | 502 |
| 1015 | 504 |
| ... | ... |

Fig. 5

ASSIGNMENT STATE MANAGEMENT TABLE

| SELECTION ID | SITE ID | ASSIGN-MENT ID | DISCUSSION STATE |
|---|---|---|---|
| 1014 | SITE 1 | 142 | NOT STARTED |
| 1015 | SITE 2 | 143 | NOT STARTED |
| 1014 | SITE 3 | 144 | NOT STARTED |
| ... | ... | ... | ... |

Fig. 6

LOCAL CUT SCREEN MANAGEMENT TABLE

| CONFER-ENCE ID | ASSIGN-MENT ID | CUT SCREEN ID | COORDINATES OF UPPER LEFT CORNER OF CUT SCREEN (x1,y1) | COORDINATES OF LOWER RIGHT CORNER OF CUT SCREEN (x2,y2) | CUT SCREEN BITMAP DATA |
|---|---|---|---|---|---|
| 41 | null | 613 | (0.14, 0.20) | (0.54, 0.35) | ... |
| 41 | null | 614 | (0.16, 0.45) | (0.56, 0.55) | ... |
| 41 | null | 615 | (0.11, 0.58) | (0.44, 0.78) | ... |
| ... | ... | ... | ... | ... | ... |

Fig. 7

ELECTRONIC CONFERENCE CONTROL DEVICE, ELECTRONIC CONFERENCE ASSISTANCE METHOD, STORAGE MEDIUM, AND COMPUTER DATA SIGNAL

BACKGROUND

1. Technical Field

The present invention relates to an electronic conference system having conference server computers to which display devices provided in conference rooms are connected, and, in particular, to generation and display control of screen images displayed on display devices used by respective conference computers.

2. Related Art

Recently, many companies have introduced electronic conference systems in order to improve efficiency of conferences. An electronic conference system of the related art has a touch panel display device placed at a position which can be seen by all participants in the conference in the conference room, and a conference server computer which controls display on the touch panel display device. In an electronic conference which uses the electronic conference system having such a structure, during the conference, processes such as common recognition of the subject to be discussed, and writing to the displayed screen image by the participants in the conference are executed by referring to displayed contents on the touch panel display device. In addition, by connecting, through a network, conference server computers provided at multiple sites to realize an identical display on all touch panel display devices, discussion on a common subject can be carried out at multiple sites.

Forms of conferences for discussing a subject (theme) include a form in which, for example, the subject to be discussed is divided into multiple sub-subjects, the conference participants are grouped into multiple groups corresponding to the divided sub-subjects and discuss the sub-subjects, and the discussion results regarding the sub-subjects by the groups are integrated in order to derive a conclusion.

SUMMARY

According to one aspect of the present invention, there is provided an electronic conference control device having a common screen management unit that manages information regarding a common screen image which is commonly displayed on a plurality of display devices in an electronic conference system; a local screen management unit that manages information regarding a local screen image which is displayed on a connected display device; a cut screen generation processor that generates a cut screen image by extracting a screen image portion contained in a region designated by a user on a screen image displayed on the connected display device; a common cut screen management unit that manages information regarding a common cut screen image which is commonly displayed on the plurality of display devices; a local cut screen management unit that manages information regarding a local cut screen image which is displayed on the connected display device; a display controller that controls display of managed screen images on the connected display device; and a screen-dividing processor that, upon selection of one or a plurality of common cut screen images from a common screen image displayed on the display device and reception of an instruction to start a discussion at a site which includes the display device, instructs the local cut screen management unit to manage a copy of information regarding the selected common cut screen image as a local cut screen image.

Another aspect to the present invention is a computer readable medium storing a program causing a computer to execute a process for assistance an electronic conference. The process comprises managing information regarding a common screen image commonly displayed on a plurality of display devices in an electronic conference system; managing information regarding a local screen image displayed on a connected display device; generating a cut screen image by extracting a screen image portion contained in a region designated by a user on a screen image displayed on the connected display device; managing information regarding a common cut screen image which is commonly displayed on the plurality of display devices; managing information regarding a local cut screen image which is displayed on the connected display device; controlling display of the managed screen image on the connected display device; and upon selection of one or a plurality of common cut screen images from a common screen image displayed on the display device and reception of an instruction to start a discussion at a site which includes the display device managing the selected common cut screen image as a local cut screen image.

BRIEF DESCRIPTION OF THE DRAWINGS

These and other aspects of the disclosure will become apparent from the following description when read in conjunction with the accompanying drawings, wherein the same reference numerals have been applied to like parts and in which:

FIG. 5 is a diagram exemplifying a data structure of information regarding a selected state of a cut screen stored and managed by a common cut screen management unit according to an exemplary embodiment of the present invention;

FIG. 6 is a diagram exemplifying a data structure of information regarding assignment state stored and managed by a common cut screen management unit according to an exemplary embodiment of the present invention;

FIG. 7 is a diagram exemplifying a data structure of information regarding a cut screen image stored and managed by a local cut screen management unit according to an exemplary embodiment of the present invention;

DETAILED DESCRIPTION

An exemplary embodiment of the present invention will now be described by reference to the drawings.

Figure 1:
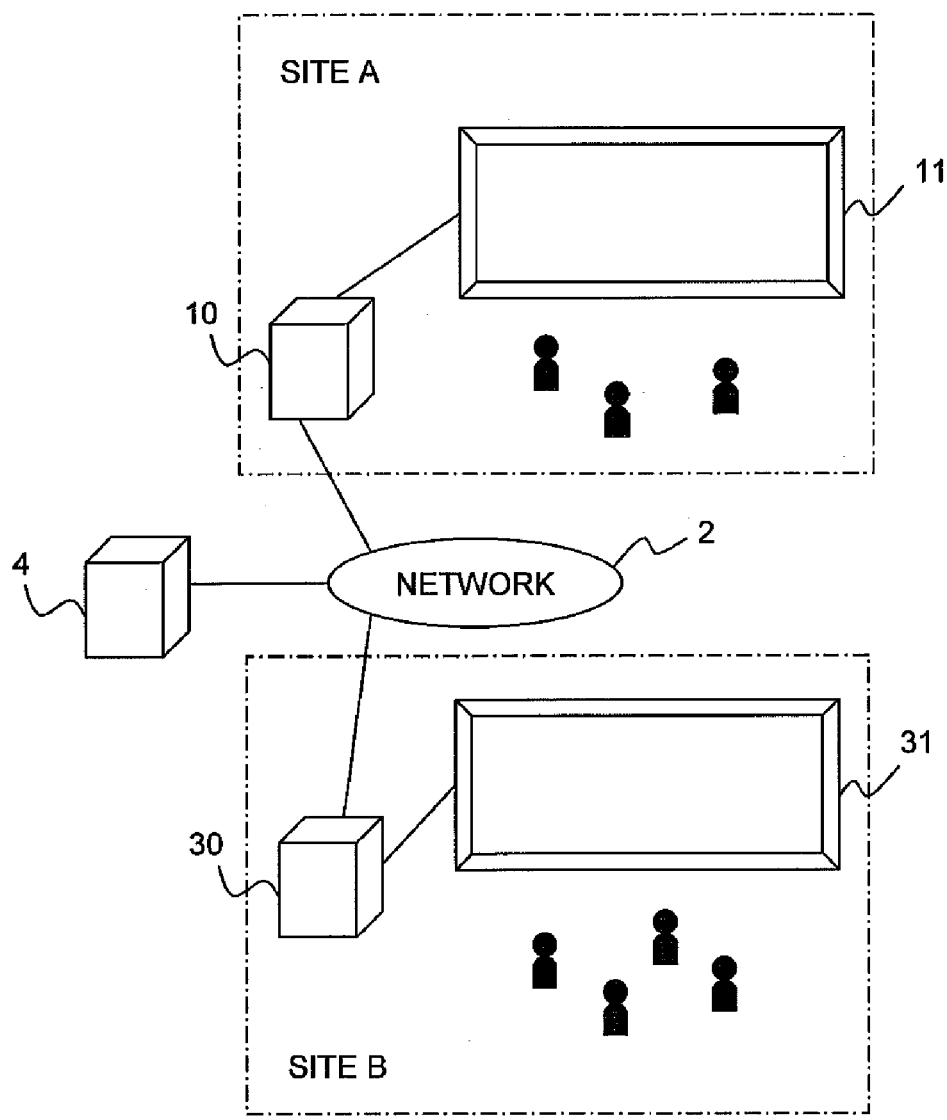
FIG. 1 is an overall structural diagram schematically showing an exemplary embodiment of an electronic conference system according to the present invention.

FIG. 1 is an overall structural diagram schematically showing an exemplary embodiment of an electronic conference system according to the present invention. FIG. 1 shows a conference information management server 4, conference server computers (hereinafter simply referred to as "conference servers") 10 and 30 provided at sites A and B, and touch panel display devices 11 and 31. The conference information management server 4 stores and manages various pieces of information necessary for realizing the electronic conference system according to the exemplary embodiment, such as management information of conference rooms, user information related to individuals participating in the conference, and information related to a conference for identifying the conference to which a user belongs. The conference servers 10 and 30 can exchange information with each other via a network 2 and cooperate to control display on the touch panel display devices 11 and 31 connected to the conference servers 10 and 30. The touch panel display devices 11 and 31 are respectively connected to conference rooms and are placed at positions which can be seen by the participants in the conference in the conference rooms. By cooperation between the conference servers 10 and 30 to control display on the touch panel display devices 11 and 31 to which the conference servers 10 and 30 are connected, respectively, the same screen image can be displayed on the touch panel display devices 11 and 31 of all sites, and the conference participants at the sites A and B can discuss a common subject displayed on the screen. In addition, it is possible to write on the touch panel display devices 11 and 31 with respect to a screen image which is being displayed, and the conference participants can discuss while writing on the screen images on the touch panel display devices 11 and 31 as necessary. Because of a basic function of the electronic conference system, the information written at one of the sites is displayed also on the touch panel display device of the other site, and, thus, the display contents at the sites are basically the same. However, when a function provided by the exemplary embodiment is utilized, different screen images can be displayed for different sites, and, thus, the electronic conference system is not limited to the above-described configuration.

For the sake of simplicity, FIG. 1 only shows two conference servers 10 and 30, but the present invention is not limited to such a configuration, and a system can be constructed by connecting a larger number of conference servers via a network. The network 2 is realized by various communication networks such as a LAN provided within an office which uses the electronic conference system. The structure of the network itself, however, is not the main point of the exemplary embodiment, and, therefore, the network is illustrated in a simplified manner.

Figure 2:
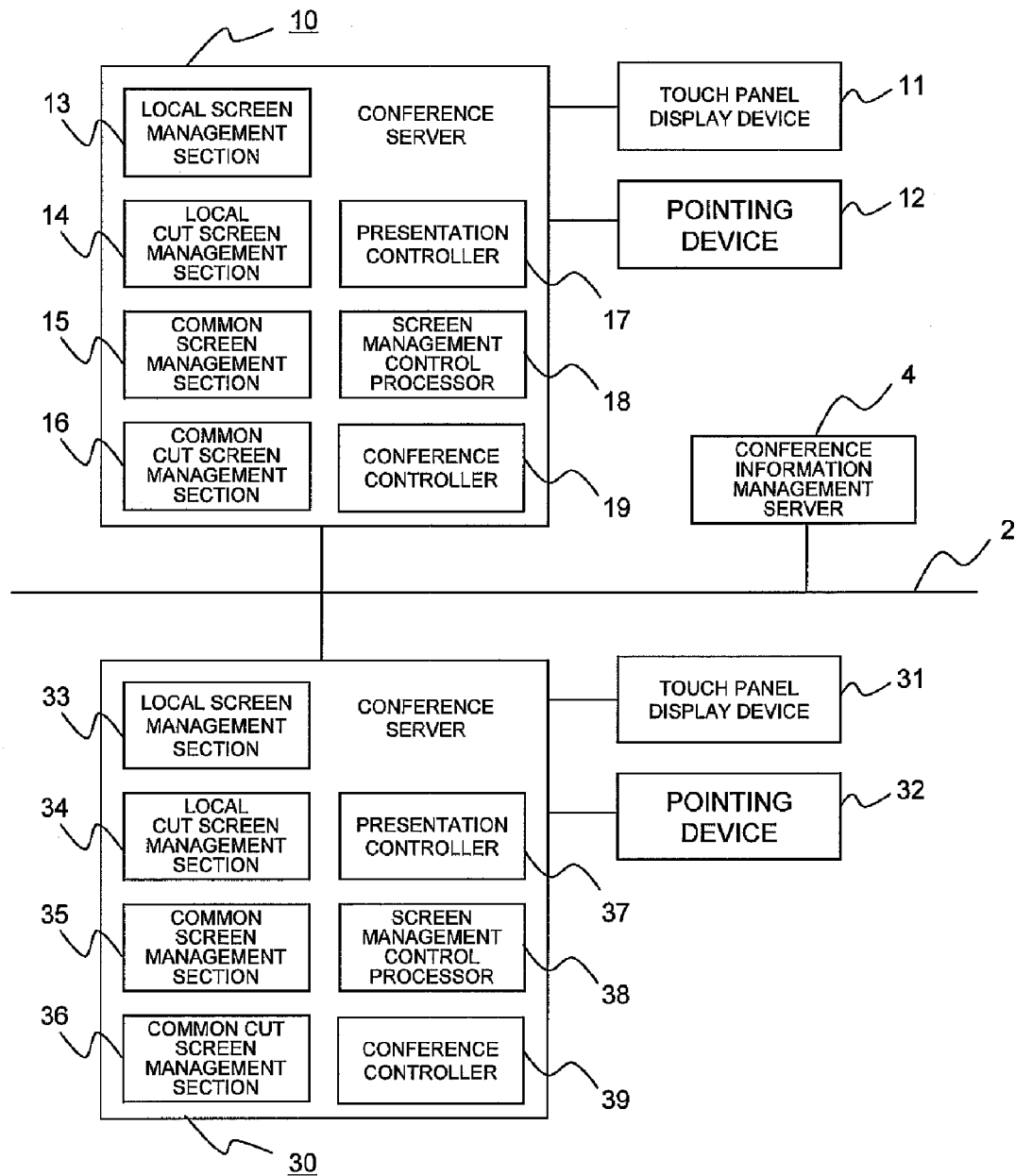
FIG. 2 is a block structural diagram of an electronic conference system according to an exemplary, embodiment of the present invention.

FIG. 2 is a block structural diagram of an electronic conference system according to the exemplary embodiment. The conference server 10 and the conference server 30 in the exemplary embodiment are of identical structure, and, therefore, the structure will be explained while exemplifying the conference server 10.

The conference server 10 has a local screen management section 13, a local cut screen management section 14, a common screen management section 15, a common cut screen management section 16, a presentation controller 17, a screen management control processor 18, and a conference controller 19. The local screen management section 13 stores and manages information regarding a screen image which is displayed only on the touch panel display device 11 connected to the conference server 10. Meanwhile, the common screen management section 15 stores and manages information regarding the screen image which is commonly displayed on all touch panel display devices in the electronic conference system. The presentation controller 17 controls display on the touch panel display device 11 connected to the conference server 10. In the exemplified embodiment, when a user forms, by means of a pointing device 12, a closed space designating a region on the screen image displayed on the touch panel display device 11, the screen image portion contained in the closed space is extracted and a cut screen image is generated. The local cut screen management section 14 stores and manages information regarding a cut screen image which is generated by the presentation controller 17 and displayed only on the touch panel display device 11. Meanwhile, the common cut screen management section 16 stores and manages information regarding a cut screen image commonly displayed on all touch panel display devices in the electronic conference system. The screen management control processor 18 corresponds to a screen-dividing processor, a screen-integrating processor, and a screen-sharing processor of the present invention and executes processes with respect to various screen images such as instructing the screen management sections 15-18 to store and manage predetermined screen images. The conference controller 19 cooperates with the screen management control processor 18 and controls the overall electronic conference which takes place by means of the exemplary embodiment of the present invention. The processing functions of the units 13-19 of the conference server 10 are realized by cooperation between a computer constructing the conference server 10 and an electronic conference assistance program operating on the CPU of the computer.

The above-described management sections 13-16 in the exemplified embodiment are constructed to store and manage information in a table formed inside the management sections. The present invention, however, is not limited to such a configuration, and it is also possible to alternatively employ a configuration in which an external storage device connected to the conference server 10 or a storage device on another computer is utilized to manage the information.

Figures 3, 4:
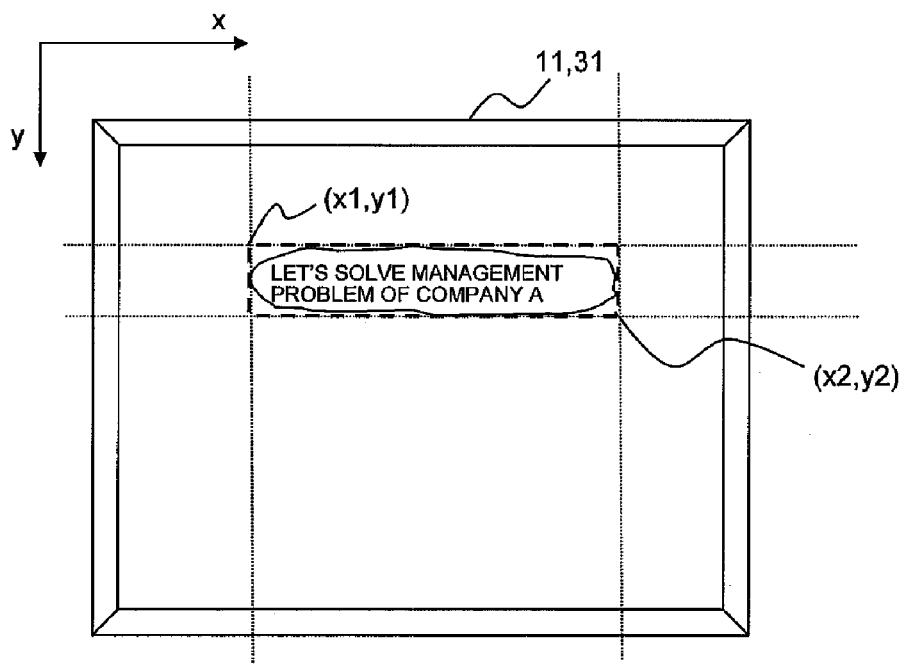
FIG. 3 is a diagram exemplifying a data structure of information regarding a cut screen image stored and managed by a common cut screen management unit according to an exemplary embodiment of the present invention.
FIG. 4 is a diagram for explaining setting of coordinate data of a cut screen handled in an exemplary embodiment of the present invention.

FIG. 3 is a diagram exemplifying a data structure of information regarding a cut screen image which is stored and managed by the common cut screen management section 16 in the exemplary embodiment. As will be described in detail below, in the exemplary embodiment, when a closed space is drawn on a screen image displayed on the touch panel display device 11 after the mode transitions to a cut screen generation mode, the screen image portion contained in the closed space is extracted and a cut screen image is generated. Then, when the cut screen image is shared by (made common to) all conference servers, information regarding the cut screen image is newly stored in the common cut screen management table shown in FIG. 3. In the common cut screen management table, a conference ID, an assignment ID, a cut screen ID, coordinates of an upper left corner of a cut screen, coordinates of a lower right corner of a cut screen, and bitmap data of a cut screen are set in correspondence to each other. The conference ID is identifier information of the conference taking place when the cut screen to be stored and managed is generated. The assignment ID is identifier information of a conference server in which the cut screen is generated. The cut screen ID is identifier information of the stored cut screen. The cut screen bitmap data are the actual data of the cut screen itself. The coordinates of the upper left corner of the cut screen and the coordinates of the lower right corner of the cut screen will be explained by reference to FIG. 4.

The cut screen image is generated by means of the user using the pointing device 12 to draw a closed space freehand on the touch panel display device 11. FIG. 4 exemplifies a display when a user forms a closed space on the screen image surrounding a text string of "Let's Solve Management Problem of Company A". In the exemplified embodiment, for the purpose of convenience the closed space is handled in the shape of a quadrangle. Thus, the closed space; that is, the display region of the cut screen image is defined with the coordinate data of the upper left corner (x1, y1) of the outer frame of the quadrangular shape including the closed space formed by the user and the coordinate data of the lower right corner (x2, y2). In the exemplary embodiment, the coordinate positions are defined by the relative positional relationship with respect to the size of the touch panel display device 11; that is, ratios when the lengths of the sides of the touch panel display device 11 in the X and Y directions are assumed to be 1, and, thus, the screen image can be easily enlarged and reduced in correspondence to the display screen size of the touch panel display device. In other words, even when the display screen sizes of the touch panel display devices in the present system differ, the present invention can be easily applied.

FIG. 5 is a diagram exemplifying a data structure of information regarding a selected state of a cut screen stored and managed by the common cut screen management section 16 in the exemplary embodiment. In the selected state management table shown in FIG. 5, a selection ID which is information for identifying a selection state of a generated cut screen and the cut screen ID of the selected cut screen are set in correspondence to each other.

FIG. 6 is a diagram exemplifying a data structure of information regarding assignment state stored and managed by the common cut screen management section 16 in the exemplary embodiment. In the assignment state management table shown in FIG. 6, the selection ID, which has already been described; a site ID, which is identifier information of the site assigned in the selected state identified by the selection ID; an assignment ID, which is information for identifying the assignment state of the generated cut screen; and a discussion state indicating the state of discussion assigned at the selected state identified by the selection ID are set in correspondence to each other.

FIG. 7 is a diagram exemplifying a data structure of information regarding a cut screen image stored and managed by the local cut screen management section 14 in the exemplary embodiment. The data structure of the local cut screen management table shown in FIG. 7 is identical to the data structure of the common cut screen management table stored and managed by the common cut screen management section 16, and, thus, will not be described again. In the local cut screen management table, a generated cut screen is set and stored when the generated cut screen is displayed only on the local touch panel display device 11.

The data stored and managed by the tables shown in FIGS. 5-7 are set and stored according to a user operation such as generation and selection of the cut screen similar to the common cut screen management table shown in FIG. 3, and, thus, will be described in detail along with the operation of the exemplary embodiment.

Figure 8:
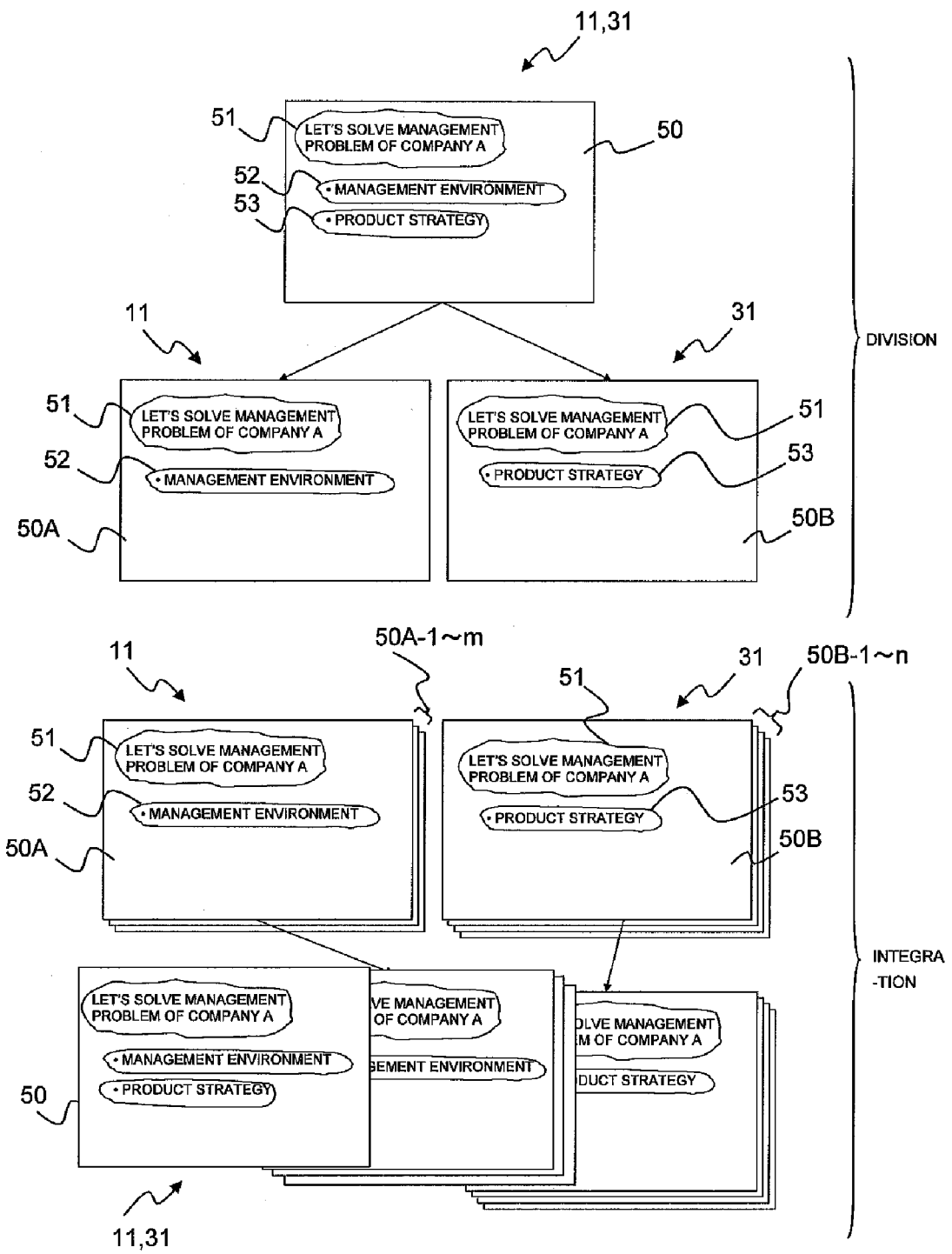
FIG. 8 is a diagram for explaining summary of a division process and an integration process of a screen image according to an exemplary embodiment of the present invention.

A summary of the division and integration processes of a screen image which constitute a characteristic of the exemplary embodiment will now be described with reference to FIG. 8.

Assume that, for example, items to be discussed (sub-subjects) include management environment and product strategy in a discussion in a conference discussing a subject of "Let's Solve Management Problem of Company A" as shown in the example of a common screen image 50 displayed on the touch panel display devices 11 and 31. The conference takes place at two sites; i.e., the sites A and B. As described above, the conference servers 10 and 30 provided at the sites cooperate so that the conference participants at both sites can hold discussions while referring to the screen image of the same content. In this example, during the discussion, it is determined that the sub-subject of the management environment is to be discussed at the site A and the sub-subject of product strategy is to be discussed at the site B, and the results of the discussions at the sites A and B; that is, the screen images including the contents written on the touch panel display devices 11 and 31 at the sites A and B, are to be integrated for overall discussion. In this case, for example, when a conference participant at a site; for example, a conference participant at the site A, performs a predetermined operation such as surrounding, by means of the pointing device 12, the text strings of "Let's Solve Management Problem of Company A", "Management Environment", and "Product Strategy", the conference server 10 generates cut screens 51, 52, and 53. The display screens at the sites A and B are at a shared state. When the conference participant performs a predetermined operation which is to be discussed later, the cut screen 51 of "Let's Solve Management Problem of Company A" which is the subject of the main conference and the cut screen 52 of "Management Environment" which is the sub-subject to be discussed at the site A are displayed on the touch panel display device 11 provided at the site A. Meanwhile, on the touch panel display device 31 provided at the site B, the cut screen 51 of "Let's Solve Management Problem of Company A" which is the subject of the main conference and the cut screen 53 of "Product Strategy" which is the sub-subject to be discussed at the site B are displayed. In this manner, in the exemplary embodiment, it is possible to display on the screen of a site only the screen image related to the item to be discussed, and the screen image related to unnecessary items can be deleted. In other words, a screen image can be handled in a divided manner for each site.

Separate discussions take place at the sites A and B, and one or multiple new screen images 50A-1-50A-m and 50B-1-50B-n are generated at the sites A and B during the discussions by notes or like. Then, the results of the separate discussions in sites A and B (screen images 50A-1-50A-m and 50B-1-50B-n) are to be gathered and integrated to resume discussion. In the exemplary embodiment, the screen images 50A, 50A-1-50A-m, 50B, and 50B-1-50B-n related to the original screen image 50 are correlated with each other so that the screen images originating from the screen image 50 can be integrally managed.

Basic division and integration processes according to the exemplary embodiment have been described. Next, an operation in the division and integration processes of the screen image in the exemplary embodiment will be described by reference to an example user interface. The conference servers 10 and 30 to be provided in the exemplary embodiment basically have the same structure, and, thus, the process to be discussed below can be executed at the initiative of either of the conference servers 10 and 30. In this description, the conference server 10 is described to take the initiative in dividing and integrating the screen image. When three or more conference servers are included in the electronic conference system, the conference server 30 is to be assumed as a representative of the conference servers other than the conference server 10 taking the initiative.

Figure 9:
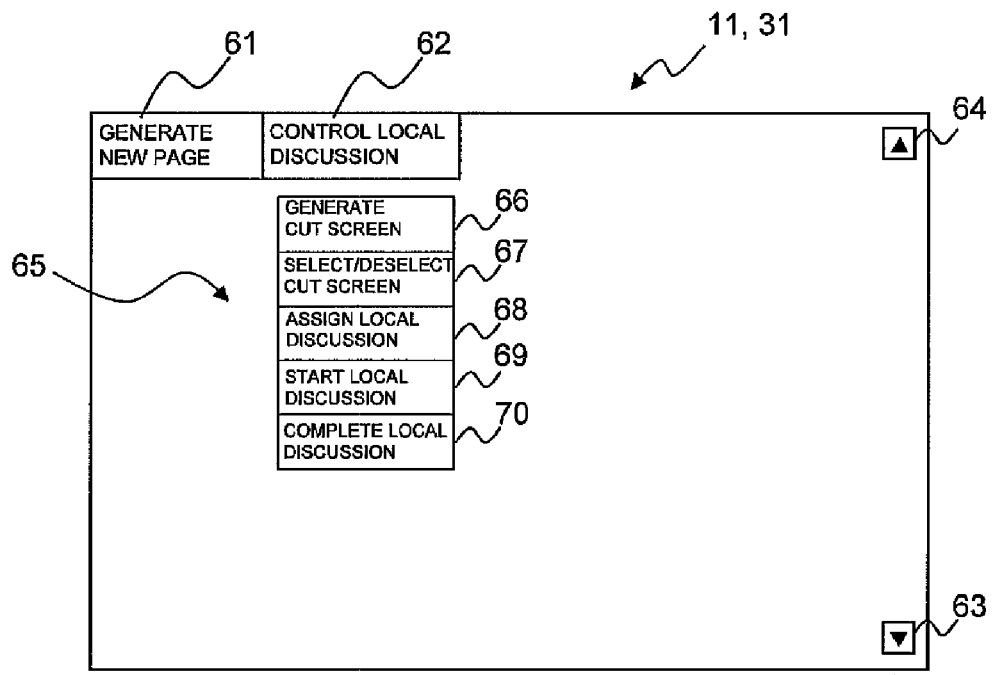
FIG. 9 is a diagram exemplifying a screen when a button or the like is displayed on a touch panel display device in an exemplary embodiment of the present invention.

FIG. 9 is a diagram exemplifying screens displayed on the touch panel display devices 11 and 31 in the exemplary embodiment. On the touch panel display devices 11 and 31, various buttons and menus generated using GUI components are displayed. FIG. 9 shows a new page generation button 61 which is selected when a new page is to be generated, a local discussion control button 62 which is selected for displaying a local discussion control menu 65 which is a pull-down menu, a next page button 63 for displaying a next page when there are multiple pages which can be displayed, and a previous page button 64 for displaying a previous page when there are multiple pages which can be displayed. The buttons 61-64 are displayed on the screen basically at all times.

Figure 10:
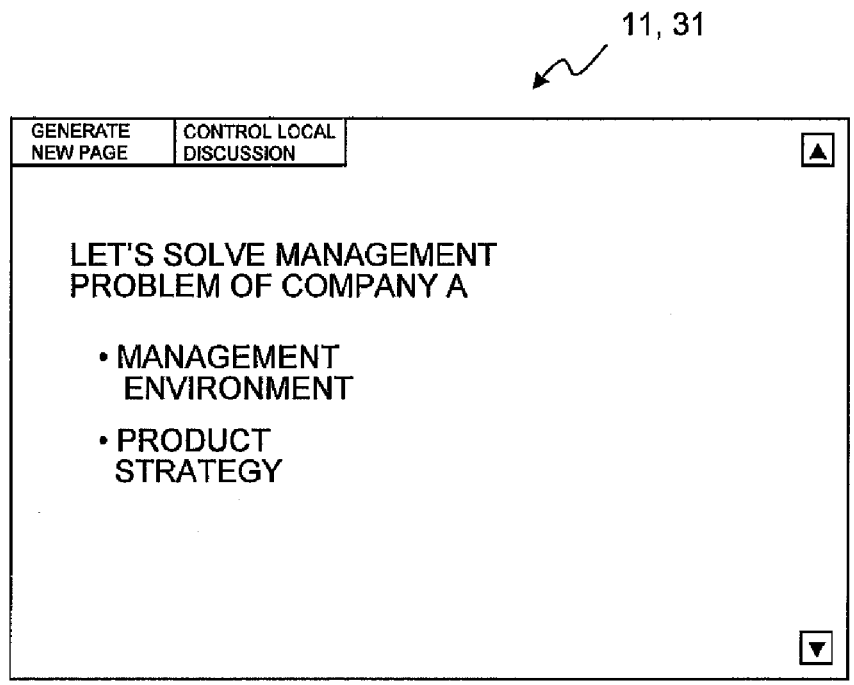
FIG. 10 is a diagram exemplifying a screen displayed on a touch panel display device in an exemplary embodiment of the present invention.

FIG. 10 is a diagram exemplifying screen displays on the touch panel display devices 11 and 31 in the exemplary embodiment. In the exemplary embodiment, a case is exemplified in which the subject of the main conference is "Let's Solve Management Problem of Company A" as shown, the sub-subjects of the subject are "Management Environment" and "Product Strategy", and the sub-subjects are to be discussed separately at sites A and B.

Figure 11:
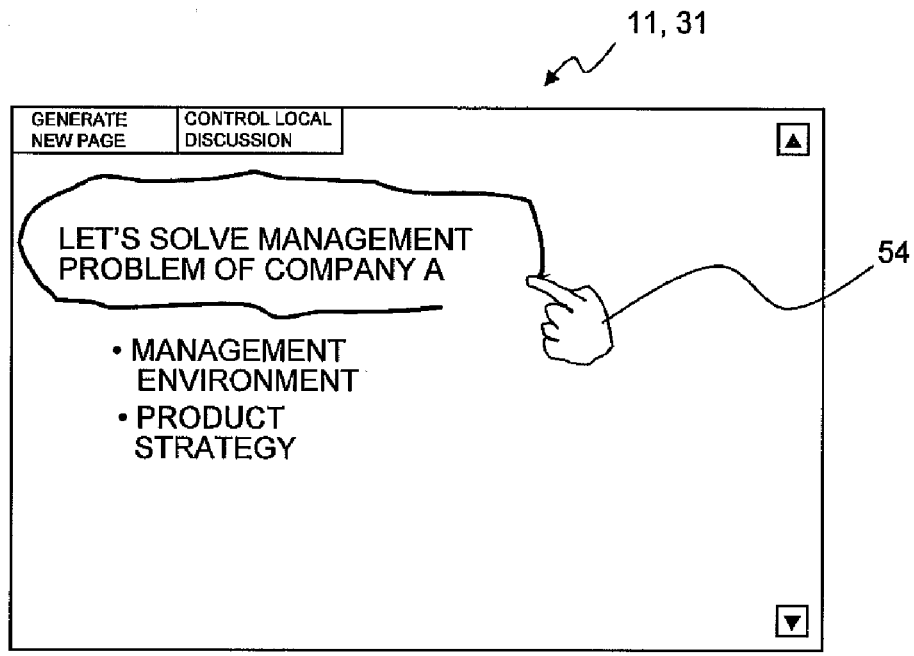
FIG. 11 is a diagram for explaining a user operation to generate a cut screen in an exemplary embodiment of the present invention.

First, the presentation controller 17 displays the screen image exemplified on FIG. 10 on the touch panel display device 11 under control by the conference controller 19. In this process, a screen image of the same content is also displayed on the touch panel display device 31 of the other sites. When a conference participant at the site A selects the local discussion control button 62, the presentation controller 17 displays the local discussion control menu 65. Then, when the conference participant selects a cut screen generation button 66 from the local discussion control menu 65, the presentation controller 17 enters a mode for generating a cut screen. When the conference participant draws a closed curve to form a closed space by means of a pointing device 12 on the screen during the cut screen generation mode, the presentation controller 17 extracts a screen image contained in the closed space to generate a cut screen image. In FIG. 11, a cursor 54 of the pointing device 12 is shown in a shape of a human hand. The screen management control processor 18 instructs the common cut screen management section 16 of its own site to store information regarding the generated cut screen image. The data structure of data stored in the common cut screen management section 16 is as shown in FIG. 3, and the conference ID acquired at the start of the electronic conference, the cut screen ID to which a unique number is assigned when the ID is generated, the upper left corner coordinates and lower right corner coordinates of the cut screen acquired through an analysis of a displayed position of the closed space on the screen image, and bitmap data present within the quadrangular shape indicated by the coordinate data are stored in correspondence to each other. In view that the assignment ID is not set at this point, the assignment ID is maintained at an initial value of "null". Furthermore, the screen management control processor 18 of the conference server 10 notifies the screen management control processor 38 of the conference server 30 of each of the other sites to request storage of information regarding the cut screen. In response to this request, the screen management control processor 38 instructs the common cut screen management section 35 to store the information regarding the cut screen. The stored information is identical to that in the site A. The screen management control processor 38 then notifies the presentation controller 37 of the screen update, and, as a result, the generated cut screen is also shown at the other sites. With such a process, generation and display of the cut screen are executed in synchronization on the screens at all sites.

Figure 12:
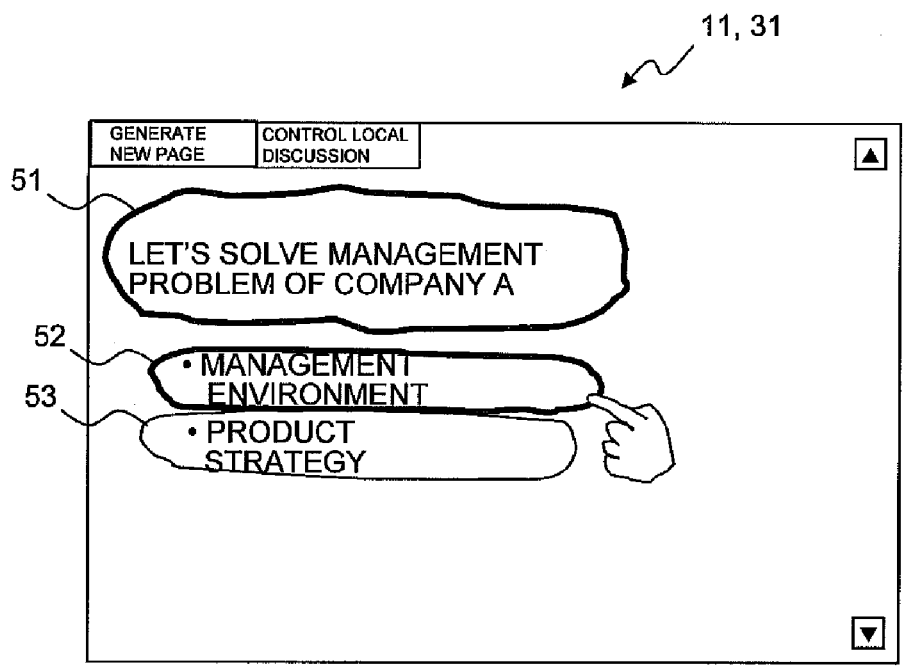
FIG. 12 is a diagram exemplifying a screen display when a cut screen is generated in an exemplary embodiment of the present invention.

A generation operation of the cut screen has been described by reference to FIG. 11. FIG. 12 exemplifies a screen display when three cut screens 51, 52, and 53 are generated as a result of the generation operation of the cut screen. The conference participant who has generated the cut screen then selects a cut screen select/deselect button 67 from the local discussion control menu 65 displayed when the user selects the local discussion control button 62. In response to this operation, the presentation controller 17 enters a mode for selecting a cut screen. When the presentation controller 17 is already in the selection mode, the presentation controller 17 applies a deselecting process. In the cut screen selection mode, a cut screen is set to the selected state by the conference participant clicking on the cut screen and the cut screen is deselected by the conference participant clicking the cut screen again. The cut screen at the selected state is displayed on the screen in a form with a boldfaced frame line of the cut screen so that the cut screen at the selected state can be distinguished from the cut screen which is not selected. The distinguishing display form is not limited to the boldfacing of the frame line, and the cut screen can be displayed in any form that enables distinction by the operator. FIG. 12 shows the cut screens 51 and 52 in the selected state. The presentation controller 17 synchronizes the selection operation in all conference servers 30 of the other sites so that the conference participants at all sites can see the selected state. The presentation controller 17 fixes the selected state at timing when the conference participant who has selected operates one or more of the buttons or menus, and notifies the screen management control processor 18 of the selected state. In response to this notification, the screen management control processor 18 instructs the common cut screen management section 16 to store the information regarding the fixed selection state to the selected state management table shown in FIG. 5. The data structure of data to be stored in the common cut screen management section 16 is as shown in FIG. 5, and the cut screen IDs of cut screens 51 and 52 which are set to the selected state and the selection IDs to which unique numbers are assigned at the time of fixing the state are set in correspondence to each other. The screen management control processor 18 notifies the screen management control processor 38 of the conference server 30 of the other site to request storage of information regarding the selected state. In response to this request, the screen management control processor 38 instructs the common cut screen management section 35 of its own site to store the information regarding the selected state. The information to be stored is identical with that in the site A. The screen management control processor 38 then notifies the presentation controller 37 of the screen update, and, as a result, the frame of the selected cut screen is also shown with a bold line in other sites. With such a process, generation and display of the cut screen are synchronously executed at all sites. In the mode for deselecting the cut screen, on the other hand, the presentation controller 17 cancels the selected state synchronized throughout all sites. The record which is set to an unused state on the selected state management table due to deselection of the selected state or the like is not immediately deleted, but is garbage-collected at a suitable timing.

Figure 13:
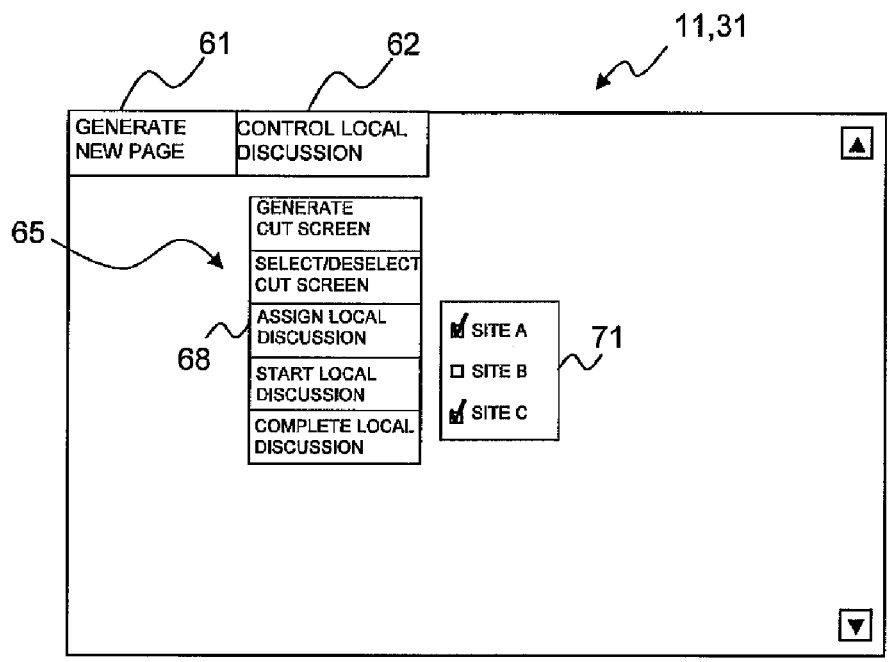
FIG. 13 is a diagram exemplifying a screen when a submenu for a local discussion assignment button is displayed on a touch panel display device in an exemplary embodiment of the present invention.
Figure 14:
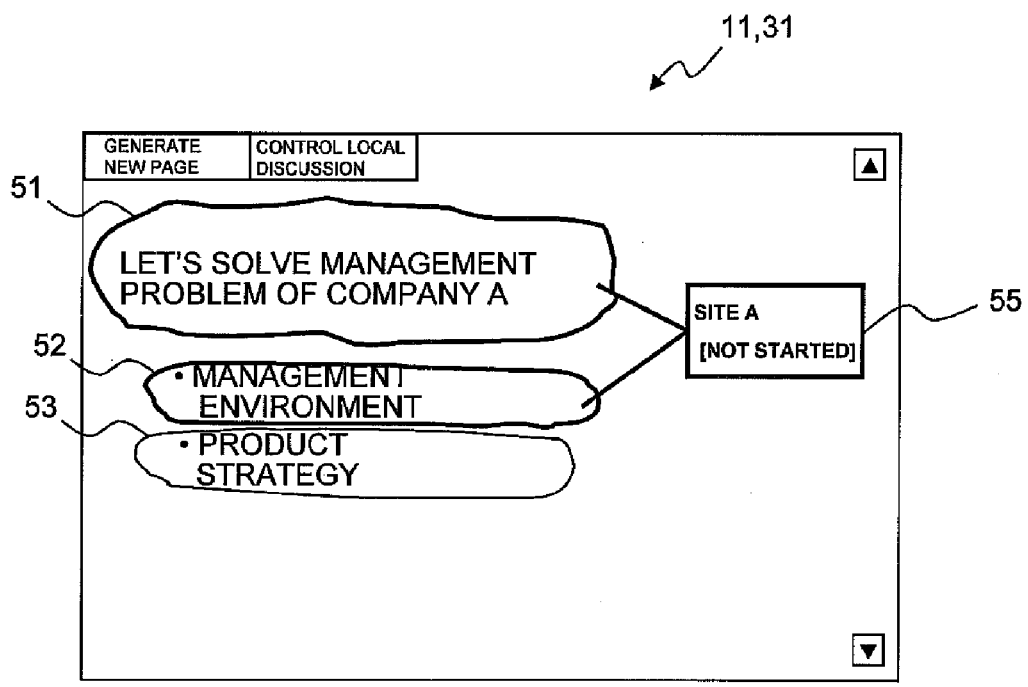
FIG. 14 is a diagram exemplifying a screen display on a touch panel display device when a local discussion is assigned in an exemplary embodiment of the present invention.

The conference participant who has selected a cut screen then selects a local discussion assignment button 68 from the local discussion control menu 65 displayed by the user selecting the local discussion control button 62. In response to this operation, the presentation controller 17 displays a sub-menu 71 of the local discussion assignment button 68. FIG. 13 exemplifies a screen display at this point. In the above description, only sites A and B are described, but in FIG. 13, a sub-menu 71 is shown for a case in which the conference servers are provided at three sites; sites A, B, and C. The sub-menu 71 is shown in FIG. 13 in an exceptional form in order to show that multiple sites can be selected from the sub-menu 71. When the conference participant selects, from the sub-menu 71, a site at which the sub-subject identified by the selected cut screen is to be discussed, the presentation controller 17 synchronizes the selected state of the site in all conference servers 30 of the other sites to thereby enable the conference participants at all sites to see the selected state. The presentation controller 17 fixes the selection of the site at the timing of the conference participant who has selected the site operating any button or menu and notifies the screen management control processor 18 of the fixed content. In response to this notification, the screen management control processor 18 instructs the common cut screen management section 16 to store the fixed content; that is, information related to the assignment state of the sub-subject to the site in the assignment state management table shown in FIG. 6. The data structure of the data to be stored in the common cut screen management section 16 is as shown in FIG. 6, and the selection ID, the assigned site, the site IDs of the sites; that is, site IDs of sites A and C in the above-described example, the assignment ID in which a unique number is assigned for each site at the time of the fixing, and the discussion state are set in correspondence to each other. At this point, because the discussions at each assigned site have not been started, an initial value of "not started" is set to the discussion state. The screen management control processor 18 notifies the screen management control processor 38 of the conference server 30 of the other sites to request storage of information regarding the assignment state. In response to this request, the screen management control processor 38 instructs the common cut screen management section 35 of its own site to store information regarding the assignment state. The information to be stored is identical with that at the site A. When assignment of the selected cut screen to the site is fixed in this manner, the presentation controller 17 displays an icon 55 to allow understanding as to which cut screen is assigned to which site, as shown in FIG. 14. An icon 55 is displayed in a synchronized manner on the touch panel display device 31 of the other sites.

Figure 15:
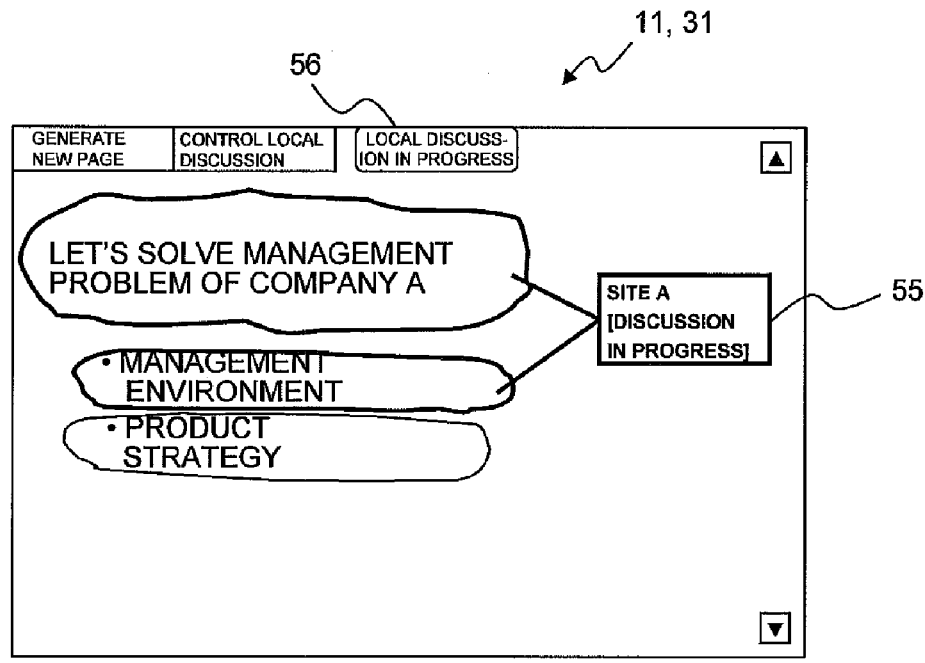
FIG. 15 is a diagram exemplifying a screen display on a touch panel display device of a site to which a local discussion is assigned when a discussion is started at the site in an exemplary embodiment of the present invention.

Then, when the conference participant at the site A clicks on the icon 55 shown in FIG. 14, the presentation controller 17 transitions to a state in which the discussion has been started locally at site A. The click operation on the icon 55 is an operation identical with the instruction operation of selecting the local discussion start button 69 from the sub-menu 71. When the user instructs the start of the local discussion in this manner, the screen management control processor 18 is notified of the start of the discussion. In response to this notification, the screen management control processor 18 instructs the common cut screen management section 16 to change the discussion state of the corresponding record in the assignment state management table from "not started" to "discussion in progress". According to the change of the discussion state, the presentation controller 17 changes the display of the icon 55 to indicate that the state has been transitioned to "discussion in progress" as shown in FIG. 15 and, at the same time, displays a mark 56 indicating local discussion on the screen.

The cut screens 51 and 52 commonly displayed on all sites are displayed on the screen in the local discussion, and, thus, the screen management control processor 18 copies the information related to the cut screens 51 and 52 stored and managed by the common cut screen management section 16 to the local cut screen management table stored by the local cut screen management section 14. The screen management control processor 18 notifies the screen management control processor 38 of the conference server 30 of the other site to request update of the information regarding the assignment state. In response to this request, the screen management control processor 38 updates the information regarding the assignment state stored and managed by the common cut screen management section 35 of its own site. A presentation controller 37 in a site to which the selected cut screen is not assigned changes the display in the icon 55 according to the updated assignment state management table as shown in FIG. 15. The mark 56 indicating local discussion is not displayed on the screen.

In the above-description, the exemplary embodiment has been described by reference to the site A. It is also possible to assign the cut screens for the subject and the sub-subject to the site B in a similar manner as shown in FIG. 12 by selecting screen images of the cut screen 51 displaying the subject of the conference and the cut screen 53 displaying the sub-subject of "Product Strategy" and selecting the site B from the sub-menu 71 shown in FIG. 13. The assignment operation of the cut screen to the sites is not limited to the conference server 10 which is provided at the site A taking the initiative in the exemplary embodiment and can be performed from a conference server 30 provided at the site B to which the sub-subject is to be assigned or from a conference server 30 of a site other than the site B. That is, the assignment operation can be performed from the conference server of any site, as long as there is no limitation.

When a local discussion is started at the site A and a conference participant selects the new page generation button 61 displayed on the touch panel display device 11, the presentation controller 17 causes a new page to be displayed on the touch panel display device 11. In the exemplary embodiment, however, as shown in FIG. 16, the new page is shown with a selection screen assigned in the above-described process pasted to the new page.

Figure 16:
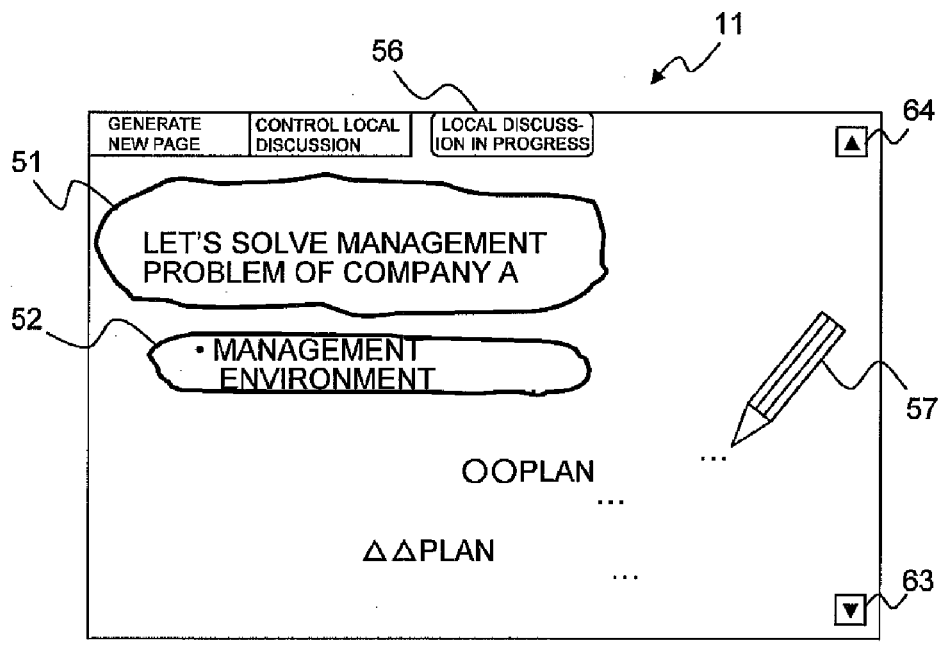
FIG. 16 is a diagram exemplifying a screen display of a touch panel display device at a site when a new page is generated during a local discussion in an exemplary embodiment of the present invention.

In the exemplary embodiment, because it is possible to extract a corresponding display portion in the screen image exemplified in FIG. 10 as a cut screen image and select only the desired cut screen image from among the extracted cut screen images, it is possible to display, on the touch panel display device 11, only the cut screen image for which the display at the local site is desired, as exemplified in FIG. 16. In the case of the above-described example, when multiple sub-subjects included in a subject are to be separately discussed at different sites, by selecting only the display portion of the sub-subject to be discussed at each site among the sub-subjects displayed on the screen, it is possible to display only the corresponding sub-subject on the screen of each of the touch panel display devices 11 and 31 of the sites. In this manner, the subject to be discussed at the site is always displayed on the screen, and discussion can be held with clear indication of the subject and sub-subject. In addition, by removing the screen image related to the items not to be discussed, a writing space on the touch panel display device 11 can be secured during the discussion.

An operation when discussion is being held at each local site will be described next.

Figure 17:
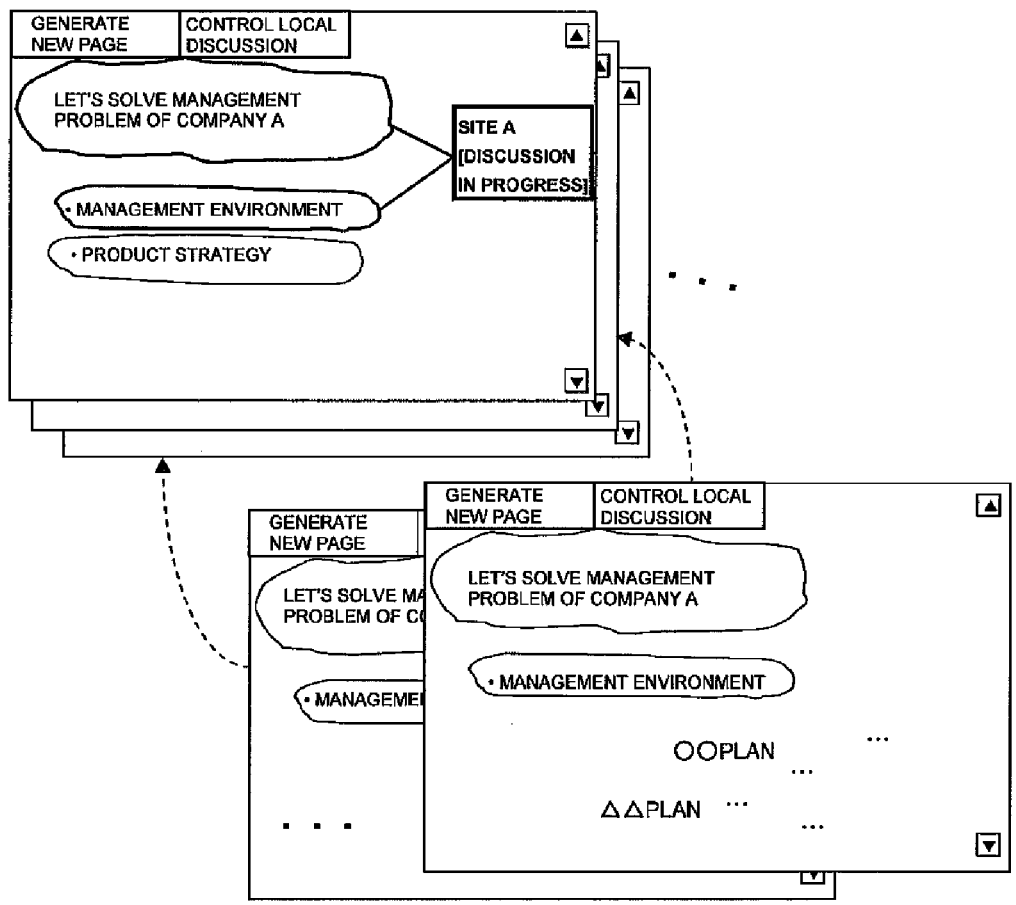
FIG. 17 is a conceptual diagram showing a relationship between pages when a page is newly added in the course of a local discussion in an exemplary embodiment of the present invention.

As shown in FIG. 16, discussion will be held while the user writes on the touch panel display device 11 by means of a predetermined pen 57. When a conference participant at the site A selects the new page generation button 61 displayed on the touch panel display device 11, the new page is displayed similar to the process described above. The presentation controller 17 in this case notifies the screen management control processor 18 that the new page generation button 61 has been selected. In response to this notification, the screen management control processor 18 instructs the local screen management section 13 to store and manage information related to the newly generated page. FIG. 17 shows a conceptual diagram of a relationship between pages (screen images) stored and managed at the local site. As shown in FIG. 17, at each local site, the generated pages are simply added in a closed local site.

Figure 18:
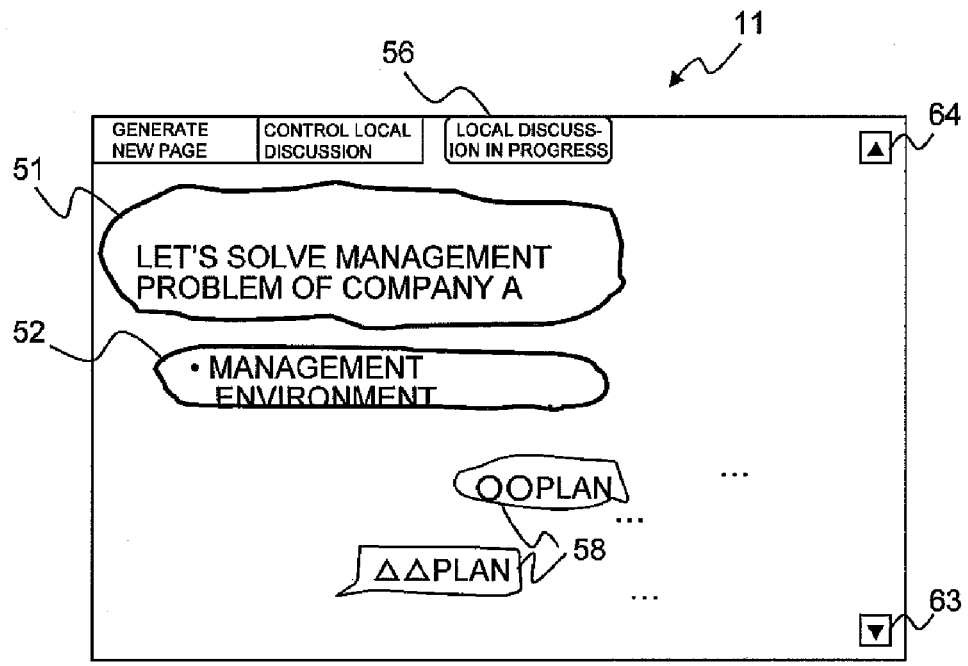
FIG. 18 is a diagram exemplifying a screen display on a touch panel display device in a site when a cut screen is generated in the course of a local discussion in an exemplary embodiment of the present invention.

The cut screen can be generated also during the discussion at the local site. FIG. 18 exemplifies a screen display in which a cut screen 58 is generated in this manner. Because the cut screen is generated during the discussion at the local site similar to the new page, the information regarding the cut screen is stored and managed by the local cut screen management section 14 under control by the screen management control processor 18.

As described, the information regarding the screen images of the page and the cut screen generated at the local site is not managed by the common screen management section 15 and the common cut screen management section 16, and, thus, these screen images are neither shared nor synchronized.

Next will be described an operation to integrate, after the discussion at the local site is completed, a screen image generated when the local discussion is started and a screen image generated during the discussion at the local site will be described.

Figure 19:
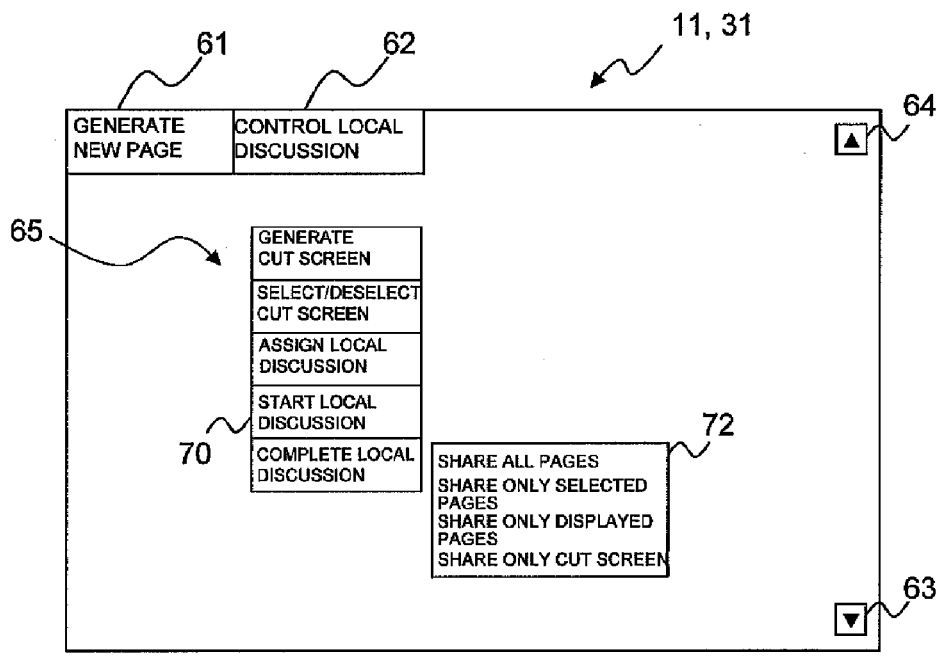
FIG. 19 is a diagram exemplifying a screen when a submenu of a local discussion completion button is displayed on the touch panel display device in an exemplary embodiment of the present invention.

When a conference participant at the local site A selects a local discussion completion button 70 from the local discussion control menu 65 displayed by selecting the local discussion control button 62 on the screen, the presentation controller 17 causes a sub-menu 72 of the local discussion completion button 70 to be displayed. FIG. 19 exemplifies a screen display at this time. Four sharing modes are displayed in a selectable manner including "share all pages", "share only selected pages", "share only displayed pages", and "share only cut screens".

When a mode other than "share only cut screens" is selected among these modes, the presentation controller 17 notifies the screen management control processor 18 of the selection. In response to this notification, the screen management control processor 18 copies the information regarding a selection target page (screen image) to the common screen management section 15. The "selection target page" in this process refers to all pages corresponding to the conference ID and the assignment ID among the pages stored and managed by the local screen management section 13 when the mode to "share all pages" has been selected. When the mode to "share only selected pages" has been selected, the selection target page corresponds to the pages selected by the conference participants from among all pages corresponding to the case of the selection of the mode to "share all pages". The pages are selected, for example, by displaying all pages in a list by a thumbnail image or the like and allowing the conference participant to select from the displayed list. When the mode to "share only displayed pages" is selected, the selection target page corresponds to the page which is being displayed when the local discussion completion button 70 is selected.

The screen management control processor 18 then copies to the common cut screen management section 16 the information regarding all cut screens in the selection target pages; that is, all cut screens corresponding to the conference ID and the assignment ID. Then, the screen management control processor 18 requests the screen management control processors 18 of the other sites to store the information so that the information regarding the selection target page and the information regarding the corresponding cut screens are copied to the common screen management sections 15 and the common cut screen management sections 16 of all sites. With this process, the selected page is shared by all sites, and, thus, the page can be considered to be integrated at all sites.

Meanwhile, when the "share only cut screen" mode is selected from the sub-menu 72, the screen management control processor 18 copies to the common cut screen management section 16 information regarding the cut screens corresponding to the assignment ID from among the cut screens stored and managed by the local cut screen management section 14. After the copying process to the common cut screen management section 16, the screen management control processor 18 notifies the screen management control processors 38 of the conference servers 30 of the other sites to request storage of the information newly stored by the copying process. In response to this request, the screen management control processor 38 instructs the common cut screen management section 36 of its own site to store the information newly stored by the copying process.

Because the cut screen image is a screen image displayed in a state of being pasted on a page (screen image), the screen management control processors 18 and 38 automatically generate a blank screen image for displaying the cut screen to be shared, superimpose the cut screen at a predetermined position on the blank page to complete the page, and instruct the common screen management sections 15 and 35 to store the information regarding the page (screen image). With this process, it is possible to additionally display, on the screen, a precise page in which only the cut screen is displayed.

In the exemplary embodiment, for the sake of convenience, all conference servers have the same processing capability. However, the present invention is not limited to such a configuration, and it is also possible to employ a configuration in which at least one conference server has each of the functions of generation of the cut screen image, selection of the cut screen, and assignment of the selected cut screen. In other words, the present invention can alternatively be realized with a configuration including a main conference server and other, secondary conference servers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic conference control device comprising:
   a common screen management unit that manages information regarding a common screen image which is commonly displayed on a plurality of display devices in an electronic conference system;
   a local screen management unit that manages information regarding a local screen image displayed on a connected display device;
   a cut screen generation processor that generates a cut screen image by extracting a portion of a screen image contained in a region designated by a user on a screen image displayed on the connected display device;
   a common cut screen management unit that manages information regarding a common cut screen image which is commonly displayed on the plurality of display devices;
   a local cut screen management unit that manages information regarding a local cut screen image which is displayed only on the connected display device;
   a display controller that controls display of managed screen images on the connected display device;
   a screen-dividing processor that, upon selection of one or more common cut screen images from a common screen image displayed on the display device and reception of an instruction to start a discussion at a site which includes the display device, instructs the local cut screen management unit to manage the selected common cut screen image as a local cut screen image, which is displayed only on the connected display device;
   a screen integration processor that, upon reception of an instruction to complete the discussion at the site, instructs the common cut screen management unit to manage a local cut screen image, which is newly generated during the discussion, as a common cut screen image, and transmits the newly generated local cut screen image to be shared and a sharing instruction to another electronic conference control device; and
   a screen sharing processor that, upon reception from another electronic conference control device of a sharing instruction and a screen image to be shared, instructs the common screen management unit or the common cut screen management unit to manage information regarding the transmitted screen image according to the sharing instruction.

2. The electronic conference control device according to claim 1, further comprising:
   a conference controller to control an overall electronic conference and to control a local discussion.

3. A tangible computer readable medium storing a program causing a computer to execute a process for assisting an electronic conference, the process comprising:
   managing information regarding a common screen image commonly displayed on a plurality of display devices in an electronic conference system;
   managing information regarding a local screen image displayed on a connected display device;
   generating a cut screen image by extracting a portion of a screen image contained in a region designated by a user on a screen image displayed on the connected display device;
   managing information regarding a common cut screen image which is commonly displayed on the plurality of display devices;
   managing information regarding a local cut screen image, which is displayed only on the connected display device;
   controlling display of the managed screen image on the connected display device;
   upon selection of one or more common cut screen images from a common screen image displayed on the display device and reception of an instruction to start a discussion at a site which includes the display device, managing the selected common cut screen image as a local cut screen image, which is displayed only on the connected display device;
   upon reception of an instruction to complete a discussion at a site which includes the display device, managing a copy of a newly generated local cut screen image as a common cut screen image, and transmitting the newly generated local cut screen image and a sharing instruction to another conference server computer; and
   upon reception from another conference server computer of a sharing instruction and a screen image to be shared, managing the transmitted screen image as a common cut screen image according to the sharing instruction.

4. The tangible computer readable medium according to claim 3, wherein the process further comprises:
   upon reception of an instruction to complete a discussion including an instruction for sharing screen image of an overall page which is used in the discussion, managing a copy of the screen image of the overall page as a common screen image.

5. The tangible computer readable medium according to claim 3, wherein the process further comprises:
   controlling, using a conference controller, an overall electronic conference; and
   controlling, using the conference controller, a local discussion.

6. An electronic conference assistance method comprising:
   managing information regarding a common screen image commonly displayed on a plurality of display devices in an electronic conference system;
   managing information regarding a local screen image displayed on a connected display device;
   generating a cut screen image by extracting a portion of a screen image contained in a region designated by a user on a screen image displayed on the connected display device;
   managing information regarding a common cut screen image which is commonly displayed on the plurality of display devices;
   managing information regarding a local cut screen image, which is displayed only on the connected display device;
   controlling display of the managed screen image on the connected display device;

upon selection of one or more common cut screen images from a common screen image displayed on the display device and reception of an instruction to start a discussion at a site which includes the display device, managing the selected common cut screen image as a local cut screen image, which is displayed only on the connected display device;

upon reception of an instruction to complete a discussion at a site which includes the display device, managing a copy of a newly generated local cut screen image as a common cut screen image, and transmitting the newly generated local cut screen image and a sharing instruction to another conference server computer; and upon reception from another conference server computer of a sharing instruction and a screen image to be shared, managing the transmitted screen image as a common cut screen image according to the sharing instruction.

7. The electronic conference assistance method according to claim 6, further comprising:

controlling, using a conference controller, an overall electronic conference; and controlling, using the conference controller, a local discussion.

8. An electronic conference control device comprising:

a common screen management unit that manages information regarding a common screen image which is commonly displayed on a plurality of display devices in an electronic conference system;

a local screen management unit that manages information regarding a local screen image displayed on a connected display device;

a cut screen generation processor that generates a cut screen image by extracting a portion of a screen image contained in a region designated by a user on a screen image displayed on the connected display device;

a common cut screen management unit that manages information regarding a common cut screen image which is commonly displayed on the plurality of display devices;

a local cut screen management unit that manages information regarding a local cut screen image which is displayed only on the connected display device;

a display controller that controls display of managed screen images on the connected display device;

a screen-dividing processor that, upon selection of one or more common cut screen images from a common screen image displayed on the display device and reception of an instruction to start a discussion at a site which includes the display device, instructs the local cut screen management unit to manage the selected common cut screen image as a local cut screen image, which is displayed only on the connected display device;

a screen integration processor that, upon reception of an instruction to complete the discussion at the site, instructs the common cut screen management unit to manage a local cut screen image, which is newly generated during the discussion, as a common cut screen image, and transmits the newly generated local cut screen image to be shared and a sharing instruction to another electronic conference control device; and a screen sharing processor that, upon reception from another electronic conference control device of a sharing instruction and a screen image to be shared, instructs the common screen management unit or the common cut screen management unit to manage information regarding the transmitted screen image according to the sharing instruction;

said common cut screen management unit that manages information identifying a selection state of the generated cut screen, information identifying a site assigned in the selection state of the generated cut screen, information identifying an assignment state of the generated cut screen, and information identifying a state of discussion assigned in the selection state of the generated cut screen.

9. A tangible computer readable medium comprising:

managing information regarding a common screen image commonly displayed on a plurality of display devices in an electronic conference system;

managing information regarding a local screen image displayed on a connected display device;

generating a cut screen image by extracting a portion of a screen image contained in a region designated by a user on a screen image displayed on the connected display device;

managing information regarding a common cut screen image which is commonly displayed on the plurality of display devices;

managing information regarding a local cut screen image, which is displayed only on the connected display device;

controlling display of the managed screen image on the connected display device;

upon selection of one or more common cut screen images from a common screen image displayed on the display device and reception of an instruction to start a discussion at a site which includes the display device, managing the selected common cut screen image as a local cut screen image, which is displayed only on the connected display device;

upon reception of an instruction to complete a discussion at a site which includes the display device, managing a copy of a newly generated local cut screen image as a common cut screen image, and transmitting the newly generated local cut screen image and a sharing instruction to another conference server computer;

upon reception from another conference server computer of a sharing instruction and a screen image to be shared, managing the transmitted screen image as a common cut screen image according to the sharing instruction; and managing information identifying a selection state of the generated cut screen, information identifying a site assigned in the selection state of the generated cut screen, information identifying an assignment state of the generated cut screen, and information identifying a state of discussion assigned in the selection state of the generated cut screen.

10. An electronic conference assistance method comprising:

managing information regarding a common screen image commonly displayed on a plurality of display devices in an electronic conference system;

managing information regarding a local screen image displayed on a connected display device;

generating a cut screen image by extracting a portion of a screen image contained in a region designated by a user on a screen image displayed on the connected display device;

managing information regarding a common cut screen image which is commonly displayed on the plurality of display devices;

managing information regarding a local cut screen image, which is displayed only on the connected display device;

controlling display of the managed screen image on the connected display device;

upon selection of one or more common cut screen images from a common screen image displayed on the display device and reception of an instruction to start a discussion at a site which includes the display device, managing the selected common cut screen image as a local cut screen image, which is displayed only on the connected display device;

upon reception of an instruction to complete a discussion at a site which includes the display device, managing a copy of a newly generated local cut screen image as a common cut screen image, and transmitting the newly generated local cut screen image and a sharing instruction to another conference server computer;

upon reception from another conference server computer of a sharing instruction and a screen image to be shared, managing the transmitted screen image as a common cut screen image according to the sharing instruction; and managing information identifying a selection state of the generated cut screen, information identifying a site assigned in the selection state of the generated cut screen, information identifying an assignment state of the generated cut screen, and information identifying a state of discussion assigned in the selection state of the generated cut screen.

* * * * *